United States Patent
Kamiguchi et al.

(10) Patent No.: US 10,983,502 B2
(45) Date of Patent: Apr. 20, 2021

(54) REMOTE MANAGEMENT DEVICE AND REMOTE MANAGEMENT METHOD

(71) Applicant: FANUC CORPORATION, Yamanashi (JP)

(72) Inventors: Masao Kamiguchi, Yamanashi (JP); Norinaga Mutai, Yamanashi (JP); Yujiro Honda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 83 days.

(21) Appl. No.: 16/427,681

(22) Filed: May 31, 2019

(65) Prior Publication Data

US 2019/0377323 A1 Dec. 12, 2019

(30) Foreign Application Priority Data

Jun. 8, 2018 (JP) .............................. JP2018-110434

(51) Int. Cl.
*G05B 19/409* (2006.01)
*G05B 19/408* (2006.01)
*G05B 19/4063* (2006.01)

(52) U.S. Cl.
CPC ......... *G05B 19/409* (2013.01); *G05B 19/408* (2013.01); *G05B 19/4063* (2013.01);
(Continued)

(58) Field of Classification Search
CPC ................ G05B 19/409; G05B 19/408; G05B 19/4063; G05B 2219/31457;
(Continued)

(56) References Cited

U.S. PATENT DOCUMENTS 9,176,649 B2 * 11/2015 Ayanam ................ G06F 3/0484
10,104,176 B2 * 10/2018 Kutch ................... H04L 67/125
(Continued)

FOREIGN PATENT DOCUMENTS

JP    H11-296217    10/1999
JP    2002-073158    3/2002
(Continued)

OTHER PUBLICATIONS

Notification of Reasons for Refusal dated Aug. 18, 2020 in JP Patent Application No. 2018-110434.
(Continued)

*Primary Examiner* — Ramesh B Patel
(74) *Attorney, Agent, or Firm* — Wenderoth, Lind & Ponack, L.L.P.

(57) ABSTRACT

A remote management server serving as a remote management device is communicably connected to, via a converter, at least one controller serving as a machine tool which allows only direct connection to another device via a predetermined connector, thus exchanging data with a fixed input/output destination and which does not have a setting function of setting a data output destination and a data input destination. The controller is further communicably connected to a mobile terminal via a network. The remote management server includes an input/output control unit configured to control settings relating to data output and data input in the controller and a setting screen providing unit configured to provide the mobile terminal with a setting screen allowing input of setting information relating to the data output and the data input.

4 Claims, 10 Drawing Sheets

(52) U.S. Cl.
CPC ............. *G05B 2219/31105* (2013.01); *G05B 2219/31457* (2013.01)

(58) Field of Classification Search
CPC ........... G05B 2219/31105; G05B 2219/13003; G05B 19/0426; G05B 2219/23298; G05B 19/4145
See application file for complete search history.

(56) References Cited

U.S. PATENT DOCUMENTS

| | | | | |
|---|---|---|---|---|
| 10,304,301 | B2* | 5/2019 | Renkis | ............. G08B 13/19693 |
| 2004/0153868 | A1* | 8/2004 | Nonaka | .................. G06Q 10/10 714/47.2 |
| 2005/0143840 | A1* | 6/2005 | Matsukura | ......... G05B 19/0423 700/9 |
| 2009/0062930 | A1* | 3/2009 | Aureli | ................... H04L 67/125 700/7 |
| 2015/0249919 | A1* | 9/2015 | Sato | ........................ H04W 4/50 455/411 |
| 2015/0305551 | A1* | 10/2015 | Rosati | ............... A47J 27/21008 426/231 |
| 2017/0008652 | A1* | 1/2017 | Figiel | .................... B65B 13/185 |

FOREIGN PATENT DOCUMENTS

| | | |
|---|---|---|
| JP | 2004-133795 | 4/2004 |
| JP | 2004-145860 | 5/2004 |
| JP | 2012-221460 | 11/2012 |

OTHER PUBLICATIONS

Notification of Reasons for Refusal dated Oct. 20, 2020 in JP Patent Application No. 2018-110434.

* cited by examiner

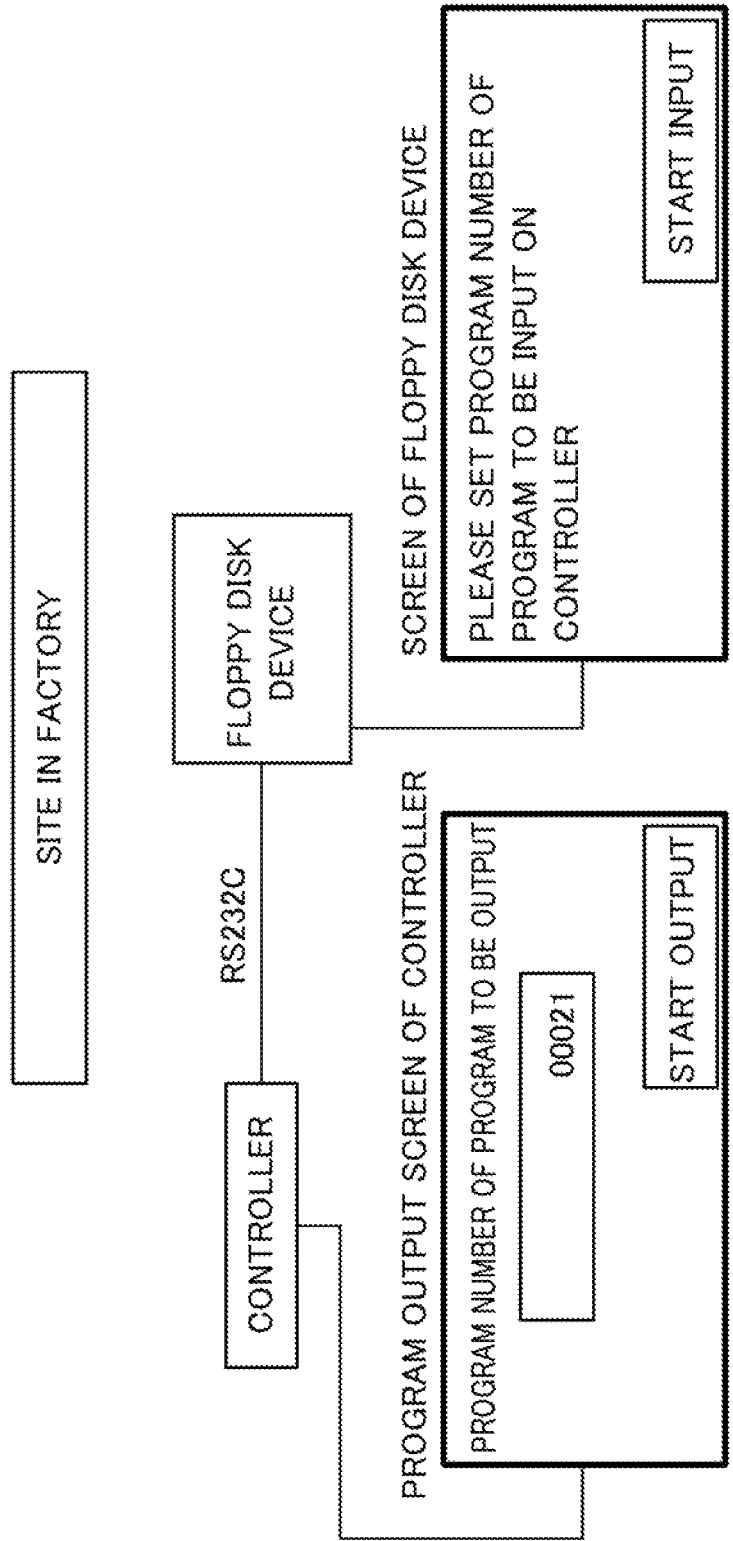

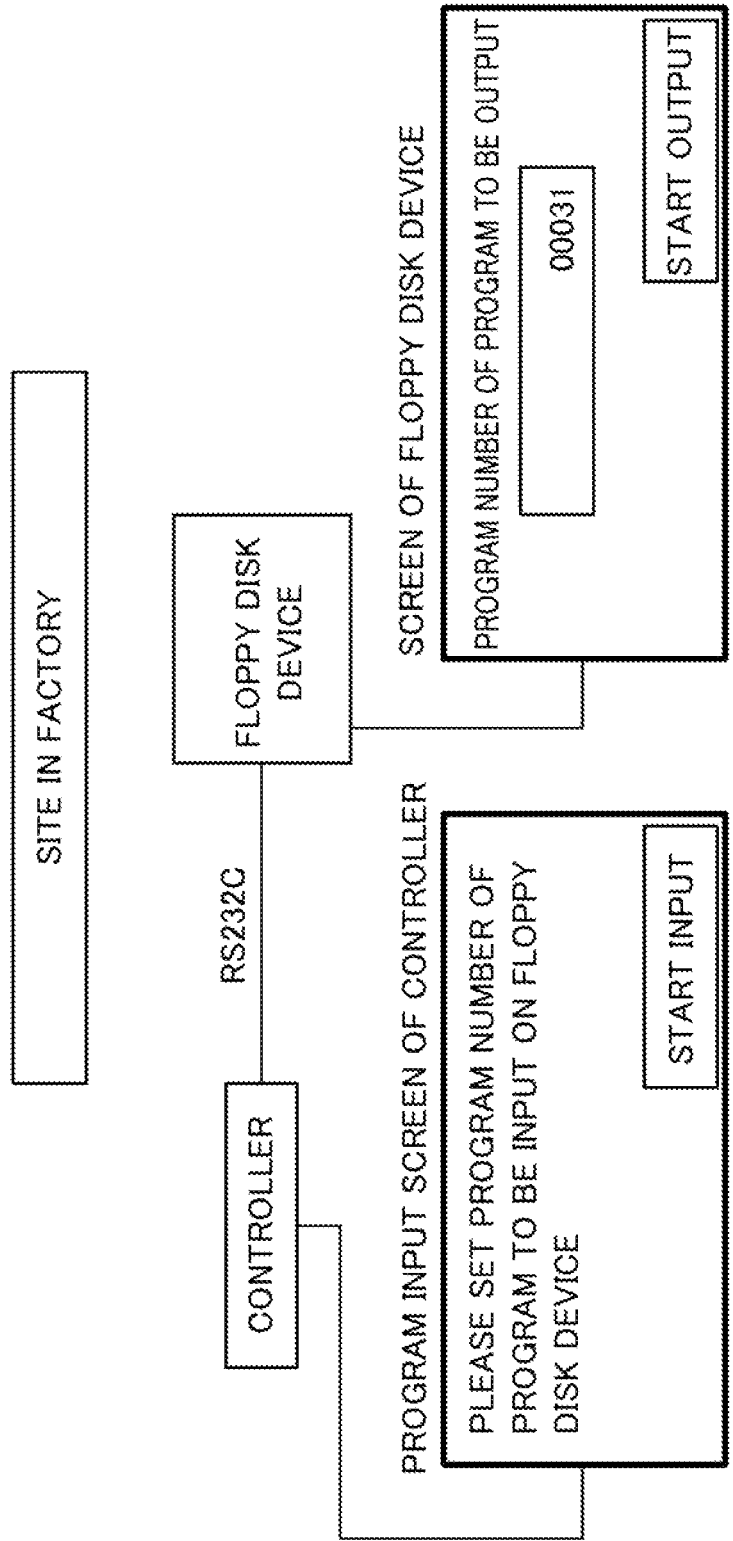

REMOTE MANAGEMENT DEVICE AND REMOTE MANAGEMENT METHOD

This application is based on and claims the benefit of priority from Japanese Patent Application No. 2018-110434, filed on 8 Jun. 2018, the content of which is incorporated. herein by reference.

BACKGROUND OF THE INVENTION

Field of the Invention

The present invention relates to a remote management device and a remote management method enabling to remotely execute settings relating to reading and writing data with respect to a machine tool.

Related Art

In a numerical controller or a programmable logic controller (PLC) device (hereinafter also referred to as a "controller") for controlling a machine tool, a conventional type controller is configured to read data only via, for example, RS232C, and store (back up) the read data in an external storage device, or is configured to write updated data from the external storage device into the controller. Thus, the conventional type of controller does not have the setting function of setting a data output destination and a data input destination. Examples of the data described above include various types of machining programs, machining parameters, and the like in the case of a numerical controller, and various types of ladder programs and I/O allocation information in the case of a PLC device. Each of FIG. 9 and FIG. 10 illustrates the configuration in which one external storage device (a floppy disk device) is directly connected to such a numerical controller via an RS232C connector. FIG. 9 is a diagram illustrating the operation for uploading a program stored in the numerical controller to the external storage device (the floppy disk device). As shown in FIG. 9, in order to write a program stored in the numerical controller into the external storage device, an operator brings the external storage device (the floppy disk device) into an input waiting state, and thereafter makes the display screen of the numerical controller display a list of the program numbers of the programs stored in the numerical controller, and designates the program number of the program to be written into the external storage device (the floppy disk device) to output the program. FIG. 10 is a diagram illustrating the operation for downloading a program stored in the external storage device (the floppy disk device) to the numerical controller. As shown in FIG. 10, in order to write a program stored in the external storage device (the floppy disk device) into the numerical controller, an operator issues an input start instruction on the display screen of the numerical controller and brings the numerical controller into the input waiting state. The operator further makes the display screen of the external storage device (the floppy disk device) display the list of the program numbers of the programs stored in the external storage device (the floppy disk device), and designates a program number to output the program. As described above, in the case where a program stored in the numerical controller is written into the external storage device only via, for example, RS232C, or where a program stored in the external storage device (the floppy disk device) is written into the numerical controller, the operator was required to issue an instruction via the display screen of the numerical controller and an instruction via the display screen of the external storage device (the floppy disk device). Therefore, the external storage device (the floppy disk device) needed to be disposed in the vicinity of the numerical controller. A data input destination and a data output destination are fixed for each numerical controller, and thus data management is complicated.

In this respect, for example, Patent Document 1 discloses the configuration in which a data transmission device 100 is connected to a machine tool 200 having only an RS232C connector via the RS232C connector, and in which a wireless LAN card 170 loaded in the data transmission device 100 is communicably connected to a server 500 via a router 400 for wireless LAN, or the configuration in which the data transmission device 100 is communicably connected to the server 500 via the router 400 via a wired LAN. The invention disclosed in Patent Document 1 enables unitary management in which the data transmission device 100 is connected to each of the plurality of machine tools 200 disposed in a factory, whereby the server 500 unitarily manages data such as the machining programs and the machining parameters of the machine tools 200. The configuration disclosed in Patent Document 1 allows the server 500 to unitarily manage data, such as programs and machining parameters of the machine tools 200. However, Patent Document 1 does not disclose the method, with respect to the machine tool 200 not having the setting function of setting a data output destination and a data input destination, of uploading data such as a program and a machining parameter of the machine tool 200 to the server 500, nor of downloading data such as a program and a machining parameter stored in the server 500 to the machine tool 200. In the case where the machine tool 200 does not have the setting function of setting a data output destination and a data input destination, in order to write data such as a program and a machining parameter stored in the server 500 into the machine tool 200, an operator is required to move to the place in which the machine tool 200 is disposed, and bring the machine tool 200 into an input waiting state by issuing an input start instruction on the display screen of the machine tool 200. Thereafter, the operator is required to move to the place in which the server 500 is disposed, make the display screen of the server 500 display the list of data numbers (directory information) of data on the programs and the machining parameters stored in the server 500, designate another machine tool 200 as a data output destination and designate the data number of the data such as the program and the machining parameter to be written into the other machine tool 200, and issue an output start instruction to the machine tool 200. Conversely, in order to write data such as a program and a machining parameter stored in the machine tool 200 into the server 500, the operator is required to move to the place in which the server 500 is disposed, make the display screen of the server 500 display a directory screen, designate another machine tool 200 as an input destination, and bring the server 500 into the input waiting state. Thereafter, the operator is required to move to the place in which the machine tool 200 is disposed, make the display screen of the machine tool 200 display the list of the data numbers of the data stored in the machine tool 200, designate the identification number such as of the program and the machining parameter to be written into the server 500, and issue an output start instruction to the server 500. As described above, for data to be read from and written into the machine tool 200, the operator is forced to move to the place in which the machine tool 200 is disposed and the place in which the server 500 is disposed, thereby imposing a heavy load on the operator.

Patent Document 1: Japanese Unexamined Patent Application, Publication No. 2004-133795

SUMMARY OF THE INVENTION

The object of the present invention is to provide a remote setting device (a server) and a remote setting method which allows an operator to perform settings by use of a portable mobile terminal with respect to data output and data input in the controller which allows only direct connection to another device via a predetermined connector (for example, "a connector 16 for RS232C" to be described below), thus exchanging data with a fixed input/output destination, and does not have the setting function of setting a data output destination and a data input destination.

(1) The present invention relates to a remote management device (for example, "a remote management server 30" to be described below) communicably connected to at least one controller (for example, "a controller 10," "a numerical controller," or "a PLC device" to be described below) which allows only direct connection to another device via a predetermined connector (for example, "a connector 16 for RS232C" to be described below), thus exchanging data with a fixed input/output destination, and which does not have a setting function of setting a data output destination and a data input destination. The remote management device includes a control unit (for example, "a control unit 31" to be described below), and a communication unit (for example, "a communication unit 33" to be described below) configured to communicate with a mobile terminal (for example, "a mobile terminal 40" to be described below) via a network. The control unit includes an input and output control unit (for example, "an input/output control unit 311" to be described below) configured to control settings relating to data output and data input in the controller, and a setting screen providing unit (for example, "a setting screen providing unit 312" to be described below) configured to provide the mobile terminal with a setting screen allowing input of setting information relating to the data output and the data input.

(2) In the remote management device according to (1), the setting screen providing unit may provide the mobile terminal with a list of identification numbers of data enabled to be output to the controller.

(3) The controller according to (1) or (2) may be a numerical controller. The input/output control unit may be configured to further execute settings relating to the data output so as to output, when the numerical controller receives an instruction to output data, the data to a set output destination, and to further execute settings relating to the data input so as to input, when the numerical controller receives an instruction to input data, the data to a set input destination.

The present invention relates to a remote management method to be executed by a remote management device (for example, "a server 30" to be described below) communicably connected to at least one controller (for example, "a controller 10," "a numerical controller," or "a PLC device" to be described below) which allows only direct connection to another device via a predetermined connector (for example, "a connector 16 for RS232C" to be described below), thus exchanging data with a fixed input/output destination, and which does not have a setting function of setting a data output destination and a data input destination. The remote management method includes a communication step of communicating with a mobile terminal via a network, an input and output control step of controlling settings relating to data output and data input in the controller, and a setting screen providing step of providing the mobile terminal with a setting screen allowing input of setting information relating to the data output and the data input by the communication step.

The present invention provides the remote setting device (the server) and the remote setting method, each of which allows an operator to execute settings by use of a portable mobile terminal with respect to data output and data input in the controller which allows only direct connection to another device via a predetermined connector (for example, "the connector 16 for RS232C" to be described below), thus exchanging data with a fixed input/output destination, and which does not have the setting function of setting a data output destination and a data input destination.

BRIEF DESCRIPTION OF THE DRAWINGS

FIG. 9 is a diagram illustrating one example of the operation for uploading a program of the numerical controller which does not allow the setting of an output destination to a directly-connected external storage device.

FIG. 10 is a diagram illustrating one example of the operation for downloading a program stored in the directly-connected external storage device to the numerical controller which does not allow the setting of an input destination.

DETAILED DESCRIPTION OF THE INVENTION

Figure 1:
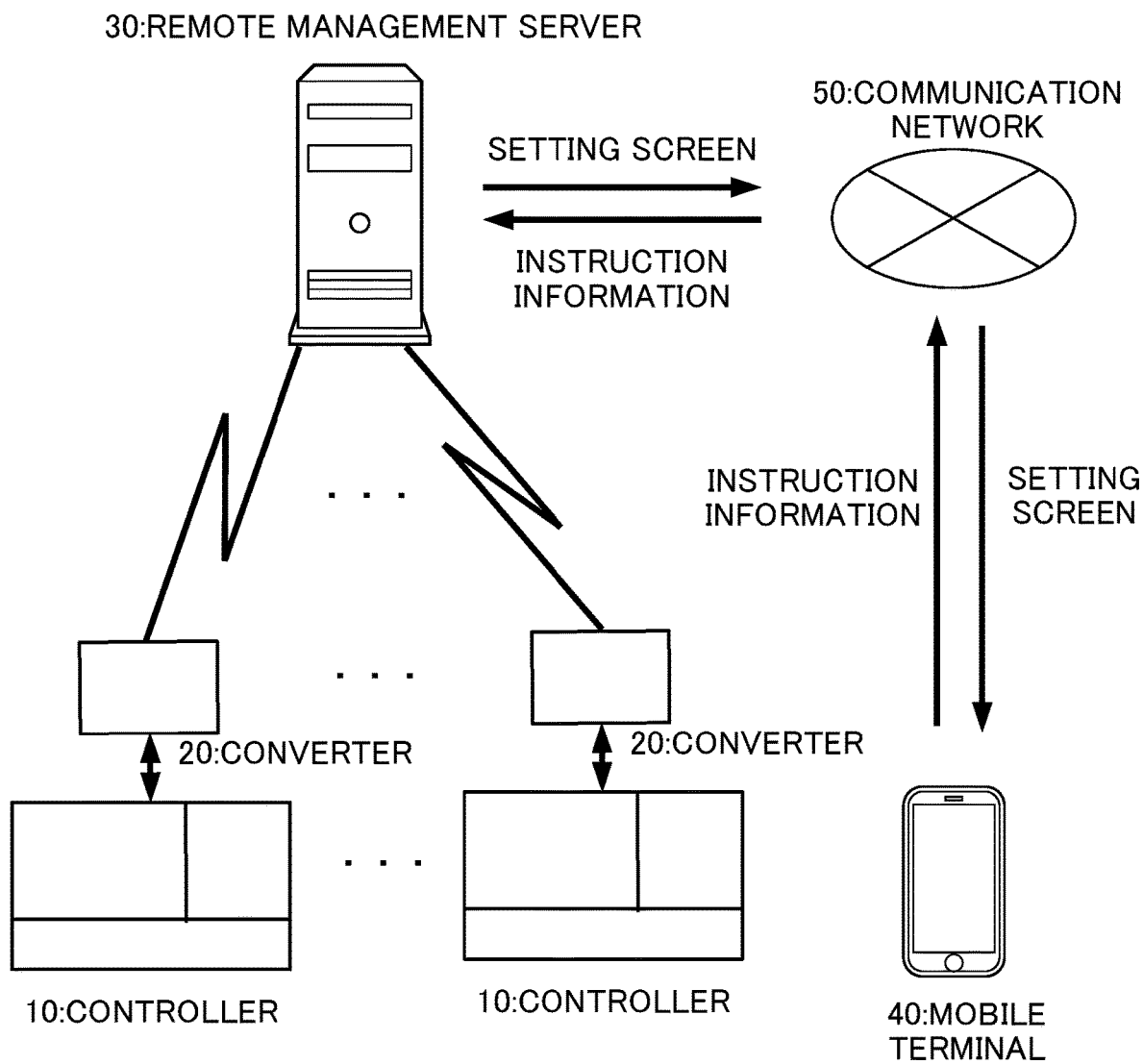
FIG. 1 is a block diagram illustrating one example of the entire configuration of a remote management system according to the present invention.

One example of an embodiment according to the present invention will be described below. In the description of the present embodiment, a numerical controller serves as a controller 10. The present invention is also applicable to a PLC device unless otherwise specified. FIG. 1 is a block diagram illustrating one example of the entire configuration of a remote management system 1 according to the present invention. As shown in FIG. 1, the remote management system 1 is configured with the controller 10 for controlling a machine tool, a converter 20, a remote management server 30 serving as a remote management device, a mobile terminal 40, and a communication network 50. It is noted that the remote management system 1 may include a plurality of controllers 10 and a plurality of converters 20.

<Controller 10>

Figure 2:
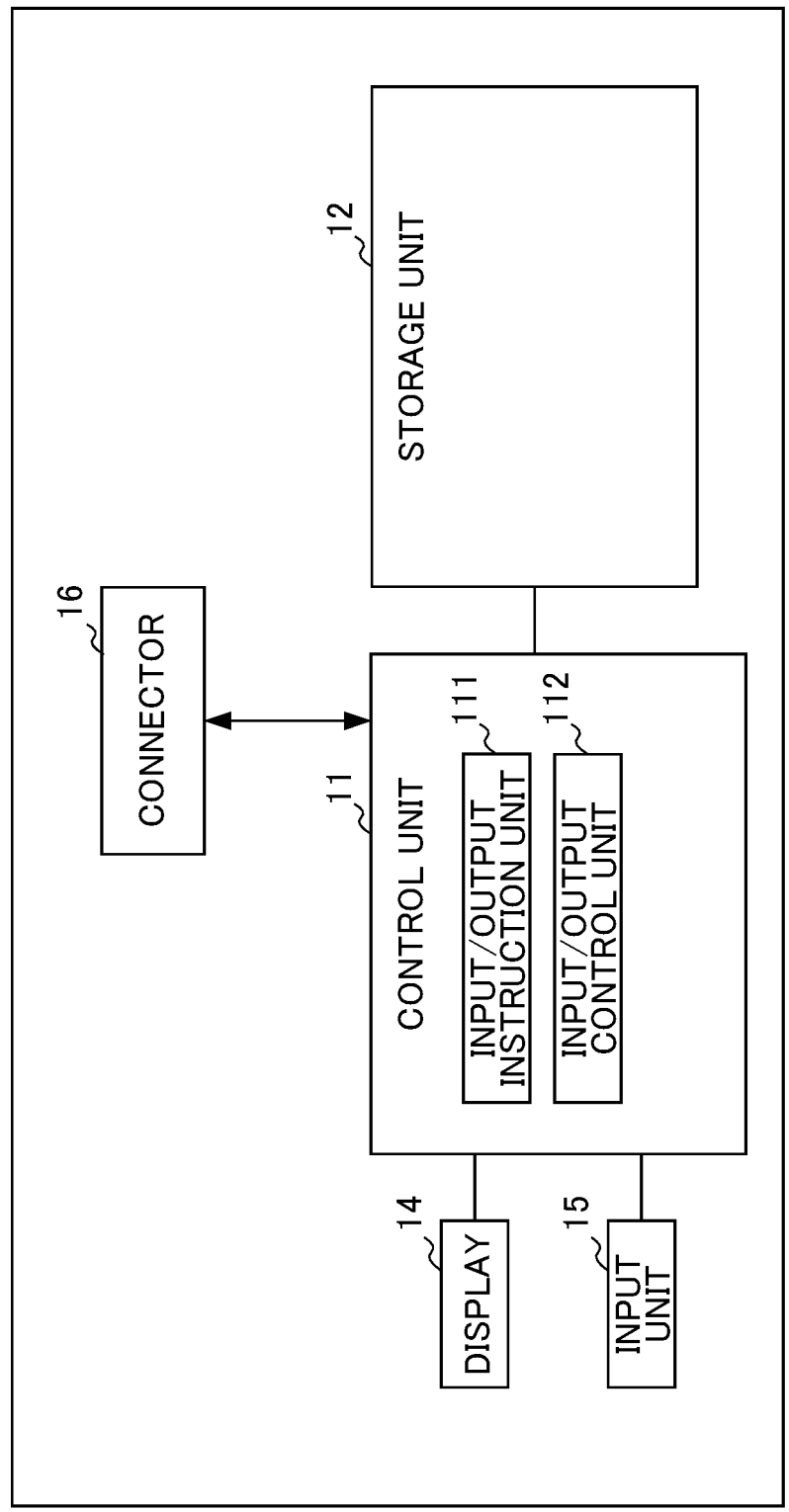
FIG. 2 is a block diagram illustrating one example of a functional configuration of a controller according to the present invention.

Unless otherwise specified, the controller 10 according to the present embodiment allows only direct connection via a predetermined connector (for example, a connector 16 for RS232C), not having a LAN connection function or the like, exchanges data with a fixed data input/output destination device, and does not have the setting function of setting an output destination and an input destination. As shown in FIG. 2, the controller 10 includes a control unit 11, a storage unit 12, a display 14, an input unit 15, and the connector 16. In the case of a numerical controller, the storage unit 12 is capable of storing data such as a machining program and a machining parameter to be used in machining a workpiece by a machine tool. In the case of a PLC device, the storage unit 12 is capable of storing, for example, a ladder program for controlling an output device by a signal issued by an input device and I/O allocation information to be used in allocating to an I/O memory the actual input/output of the input/output unit attached to the PLC device. The controller 10 is further capable of outputting data to an external device (for example, an external storage device) directly connected via a predetermined connector (for example, the connector 16 for RS232C). Conversely, the controller 10 is capable of receiving data from an external device (for example, an external storage device) directly connected via a predetermined connector (for example, the connector 16 for RS232C). Thus, the control unit 11 includes an input/output instruction unit 111 and an input/output control unit 112. In order to output data such as a program stored in the storage unit 12 to a directly-connected external device (for example, an external storage device), the input/output instruction unit 111 displays on the display 14 the list of the data numbers of the data such as programs stored in the storage unit 12 as shown in FIG. 9, so as to prompt an operator to designate the data number of the program or the like to be output to the directly-connected external device. In order to receive data such as a program from a directly-connected external device, the input/output instruction unit 111 displays on the display 14 the input start instruction to bring the controller 10 into an input waiting state as shown in FIG. 9, so as to prompt an operator to bring the controller 10 into the input waiting state. It is noted that a PLC device may not have the display 14. In that case, the remote management server 30 generally performs the operations relating to the uploading of data to the remote management server 30 and the downloading of data from the remote management server 30. Just after the PLC device is powered on, the PLC device waits for instructions to upload and download data. The input/output control unit 112 outputs the program designated by an operator to the directly-connected external device. The input/output control unit 112 further receives data such as a program from the directly-connected external device. It is noted that although the controller 10 includes a functional unit specific to a numerical controller or a PLC device in addition to these functional units, they are known to those skilled in the art, and thus the description thereof will be omitted.

<Converter 20>

As shown in FIG. 1, the converter 20 is directly connected to the controller 10 via a predetermined connector (for example, a connector for RS232C), and is also communicably connected to the remote management server 30 via, for example, a terminal for Ethernet (registered trademark). It is noted that, in the case where the remote management server 30 includes an interface for RS232C (that is, has a function equivalent to the converter 20), the controller 10 may be directly connected to the interface for RS232C included in the remote management server 30. Therefore, the converter 20 includes a predetermined connector (for example, a connector for RS232C) or the like for connection to the controller 10 which allows only direct, connection to an external device via a predetermined connector (for example, the connector 16 for RS232C). The converter 20 further includes, for example, a terminal for Ethernet (registered trademark) for connection to the remote management server 30. It is noted that the terminal included in the converter 20 is not limited to a connector for RS232C or a terminal for Ethernet. The converter 20 may include an arbitrary connector for connection to the controller 10 instead of a connector for RS232C. The converter 20 may further include an arbitrary terminal for connection to the remote management server 30 The converter 20 is capable of converting the protocol of the data (for example, a program or a parameter) received from the controller 10 via a predetermined connector (for example, a connector for RS232C) on the basis of a preset communication protocol and transmitting the data to the remote management server 30 via, for example, a terminal for Ethernet. Conversely, the converter 20 converts the protocol of the data (for example, a program or a parameter) received from the remote management server 30 via, for example, a terminal for Ethernet on the basis of a preset communication protocol and transmits the data to the controller 10 via a predetermined connector (for example, a connector for RS232C). More specifically, in the case where the remote management server 30 transmits data to the controller 10, as for the side of the controller 10, the controller 10 is brought into the state of waiting for the input of the data so as to be able to receive the data. On the other hand, as for the side of the remote management server 30, the remote management server 30 transmits the data to the converter 20 directly connected to the controller 10, whereby the data is able to be transmitted from the remote management server 30 to the controller 10 via the converter 20. Similarly, in the case where the controller 10 transmits data to the remote management server 30, as for the side of the remote management server 30, the remote management server 30 is brought into the state of waiting for the input of the data so as to be able to receive the data. On the other hand, as for the side of the controller 10, the controller 10 outputs the data to the converter 20 directly connected to the controller 10, whereby the data is able to be transmitted from the controller 10 to the remote management server 30 via the converter 20. It is noted that the communication for connection between the converter 20 and the remote management server 30 may be established with a wired communication network or the like and is not limited to a network such as a wireless LAN or a wireless communication network. Alternatively, the converter 20 may be connected to the remote management server 30 via a plurality of networks.

<Remote Management Server 30>

As shown in FIG. 1, the remote management server 30 is capable of exchanging each piece of data directly or via the converter 20 with at least one controller which allows only direct connection via, for example, a connector for RS232C, and which exchanges data with a fixed data input/output destination. The remote management server 30 allows connection to at least one mobile terminal 40 via a network; for example, a wireless LAN or a wireless communication network.

Figure 3:
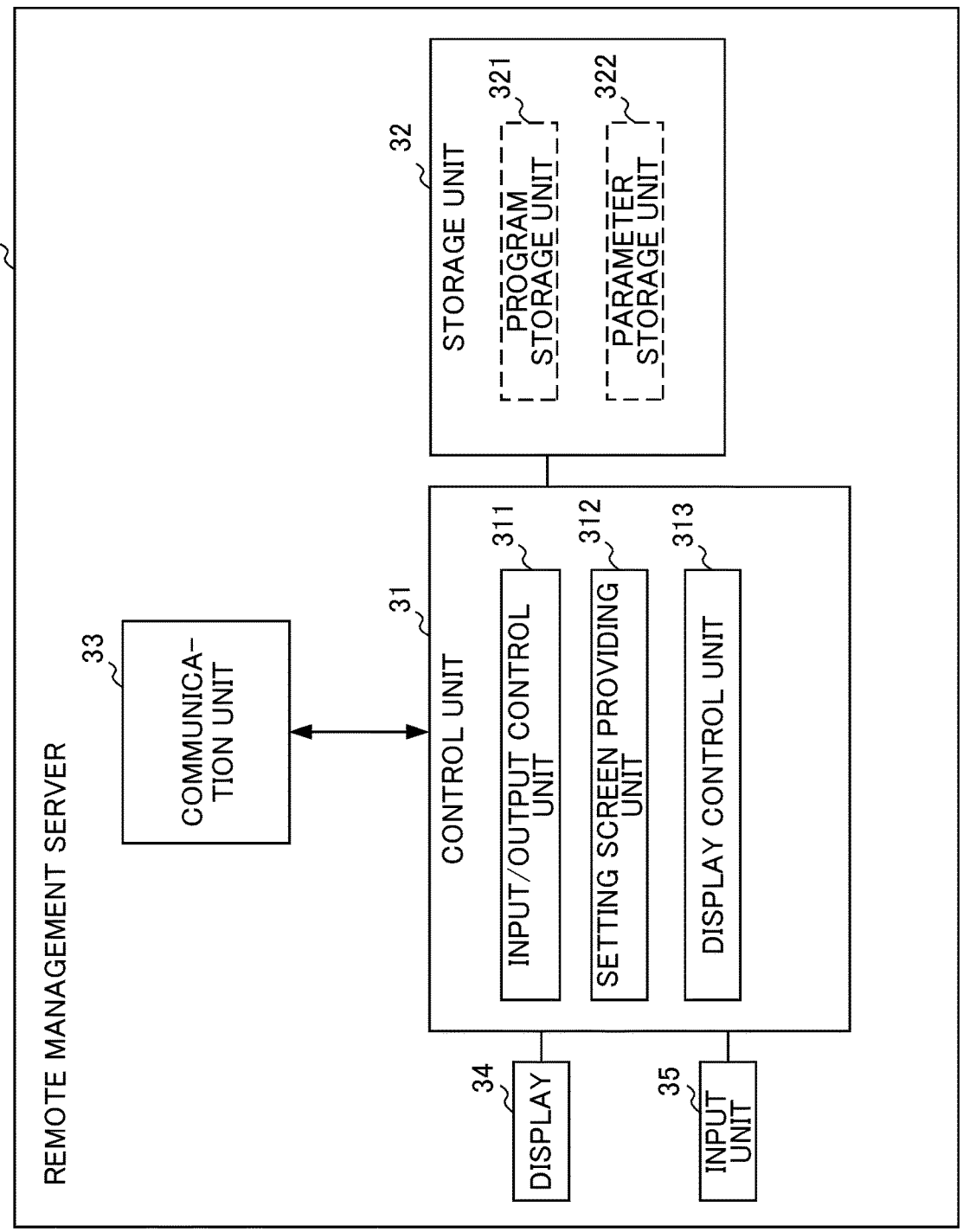
FIG. 3 is a block diagram illustrating one example of a functional configuration of a remote management server according to the present invention.

FIG. 3 is a block diagram illustrating the functional configuration of the remote management server 30. The remote management server 30, which is an information processing apparatus (computer), for example, a personal computer or a server apparatus, includes various types of input/output devices in addition to a control unit 31, a storage unit 32, and a communication unit 33. The control unit 31 is configured with an arithmetic processing unit such as a microprocessor to control respective units included in the remote management server 30. It is noted that the remote management server 30 is not limited to an information processing apparatus (computer) such as a personal computer or a server apparatus. The remote management server 30 may be, for example, a virtual server set on the cloud in that case, for example, the mobile terminal 40 functions as a display. The control unit 31 will be detailed below.

The storage unit 32, which is configured with, for example, a magnetic disk or a semiconductor memory, stores various types of information, such as programs including control programs called firmware or operating system, and programs for performing remote management and control processing, as well as data to be used by each controller 10 (for example, programs and parameters). In FIG. 3, the storage unit 32 includes a program storage unit 321 and a parameter storage unit 322. In the program storage unit 321, the programs and the like, which are the information stored in the storage unit 32 to be used by respective controllers 10, are subjected to directory management for each controller 10. In the parameter storage unit 322, the parameters to be used by respective controllers 10 are subjected to directory management for each controller 10. More specifically, the program storage unit 321 may store the programs to be used by the controllers 10 in a directory structure for each controller 10, for example. In the case where a program corresponding to a targeted program number is subjected to version management, the program storage unit 321 may store, for example, a version number, a creation date of the program, an update date, and a relation with respect to calling and usage between these programs it is noted that the directory structure is not limited to the one described above. An arbitrary directory structure may be used.

The communication unit 33, which has, for example, a digital signal processor (DSP), realizes wireless communication with the mobile terminal 40 via the communication network 50 on the basis of a standard such as 3rd Generation (3G) or Wi-Fi (registered trademark). The communication unit 33 further realizes communication with the converter 20 via the communication network 50 including a wired communication network. Accordingly, the communication unit 33 is capable of communicating via the respective converters 20 with the respective controllers 10 connected to the respective converters 20.

The remote management server 30 may additionally include a display 34 and an input unit 35. The display 34 is configured with a display device such as a liquid crystal display or an organic electroluminescent panel. The display 34 displays an image by receiving an instruction from the control unit 31. The input unit 35 is configured with an input device (not shown) and others such as a keyboard or a touch panel provided on the display surface of the display 34 in an overlapping manner. A signal based on input operation through the input unit 35, for example, pressing of a key or a touch on the touch panel by an operator, is output to the control unit 31, thereby enabling to realize the operation such as input operation or a selection operation by the operator.

The control unit 31 is detailed below. The control unit 31 is configured with a microprocessor having, for example, a central processing unit (CPU), a random access memory (RAM), a read only memory (ROM), and an input/output (I/O) unit. The CPU executes each program read from the ROM or the storage unit 32. The CPU reads information from the RAM, the ROM, and the storage unit 32 at the time of the execution, writes information into the RAM and the storage unit 32, and exchanges signals with the communication unit 33, the display 34, and the input unit 35. In this way, hardware and software (a program) are made to cooperate to realize processing in the present embodiment. As described above, the control unit 31 executes each program, thereby making the remote management server 30 function as a predetermined means (hereinafter collectively referred to as "remote management and control unit"). The control unit 31 executes each program, thereby further making the remote management server 30 execute a predetermined step (hereinafter collectively referred to as "remote management and control step"). The function of the control unit 31 is described below from the viewpoint of the remote management and control unit it is noted that the description based on the viewpoint of the remote management and control step (method) will be omitted because the remote management and control step is able to be described by replacing "unit" with "step."

The control unit 31 includes an input/output control unit 311, a setting screen providing unit 312, and a display control unit 313 as functional blocks.

The input/output control unit 311 controls the settings relating to the input and the output including a data input/output destination and the like in the controller 10 and controls the input/output of the data on the basis of the settings. More specifically, the input/output control unit 311 receives (inputs) data such as a program or a parameter stored in each controller 10 directly or via the directly-connected converter 20 on the basis of the setting instruction to be described below or the like and writes and stores (uploads) the data in the designated directory of the program storage unit 321 or the parameter storage unit 322 of the remote management server 30. The operation will be detailed below. Conversely, the input/output control unit 311 outputs to the controller 10 (downloads) directly or via the directly-connected converter 20, data such as a program or a parameter of the controller 10 stored in the program storage unit 321 or the parameter storage unit 322 of the remote management server 30 on the basis of the setting instruction or the like. The operation will be detailed below. In the case of a numerical controller as an example, the machining programs or the machining parameters which have been subjected to the adjustment such as correction by an operator in the actual machining in the controller 10 and have been used in the actual machining are uploaded to the remote management server 30, thereby enabling unitary managing. Conversely, the predetermined machining programs and the predetermined machining parameters stored for each controller 10 in the storage unit 32 of the remote management server 30 are downloaded to the controller 10, thereby enabling to reuse the optimum program or the optimum machining parameter in actual machining. It is noted that, as described above, the storage unit 32 of the remote management server 30 may store various types of data uploaded from the respective controllers 10 together with, for example, version numbers. The storage unit 32 may store various types of data together with the date of data creation or update, identification information of a creator or an updater (operator) of the data, a relation with respect to calling and usage between programs.

The setting screen providing unit 312 provides the mobile terminal 40 or the remote management server itself (the display control unit 313 to be described below) with a setting screen for assisting an operator in issuing a setting instruction to the input/output control unit 311. The setting screen providing unit 312 further inputs the setting instruction information input by the operator via the setting screen of the mobile terminal 40 or the remote management server itself into the input/output control unit 311. It is noted that, as described below, the mobile terminal 40 displays the setting screen provided by the setting screen providing unit 312 and prompts the operator to input a setting instruction. More specifically, the setting screen providing unit 312 provides the mobile terminal 40 or the remote management server 30 itself (the display control unit 313 to be described below) with the directory setting screen for setting a directory, the setting screen for starting the execution of writing and storing (uploading) and the like via the communication unit 33 in order to write and store (upload) data such as a program or a parameter stored in and used by each controller 10 into an arbitrary directory of the program. storage unit 321 or the parameter storage unit. 322 of the remote management server 30. Similarly, the setting screen providing unit 312 provides the mobile terminal 40 or the remote management server 30 itself (the display control unit 313 to be described below) with the setting screen indicating the list of the controllers allowing the selection of the controller 10 as a download destination of data, the download setting screen for allowing the selection of data to be downloaded, the instruction screen for starting the execution of downloading, and the like, via the communication unit 33, in order to write (download) data such as a program or a parameter of each controller 10 stored in the program storage unit 321 or the parameter storage unit 322 of the remote management server 30, into the controller 10. With this operation, the mobile terminal 40 is able to display the setting screen provided by the setting screen providing unit 312 to prompt the operator to input a setting instruction. Similarly, the remote management server 30 (the display control unit 313 to be described below) is able to display the setting screen provided by the setting screen providing unit 312 to prompt the operator to input a setting instruction. These operations will be detailed below. The setting screen providing unit 312 outputs the instruction information received from the mobile terminal 40 to the input/output control unit 311. With this operation, the setting screen providing unit 312 assists the operator in issuing a setting instruction related to the output and the input including a data input/output destination and the like in the controller 10. The setting screen providing unit 312 may display the setting screen on the display 34 of the remote management server 30 to assist the operator in issuing a setting instruction. It is noted that the setting screen providing unit 312 is able to be realized by, for example, a Web application or a Web service.

The display control unit 313 displays display data, for example, the setting screen, on the display 34 of the remote management server 30. The display control unit 313 transmits the instruction data input via the input unit 35 to the setting screen providing unit 312 or the like. It is noted that the function of the display control unit 313 is able to be realized by, for example, a Web service, a Web browser, and the like of the remote management server 30.

<Mobile terminal 40>

Figure 4:
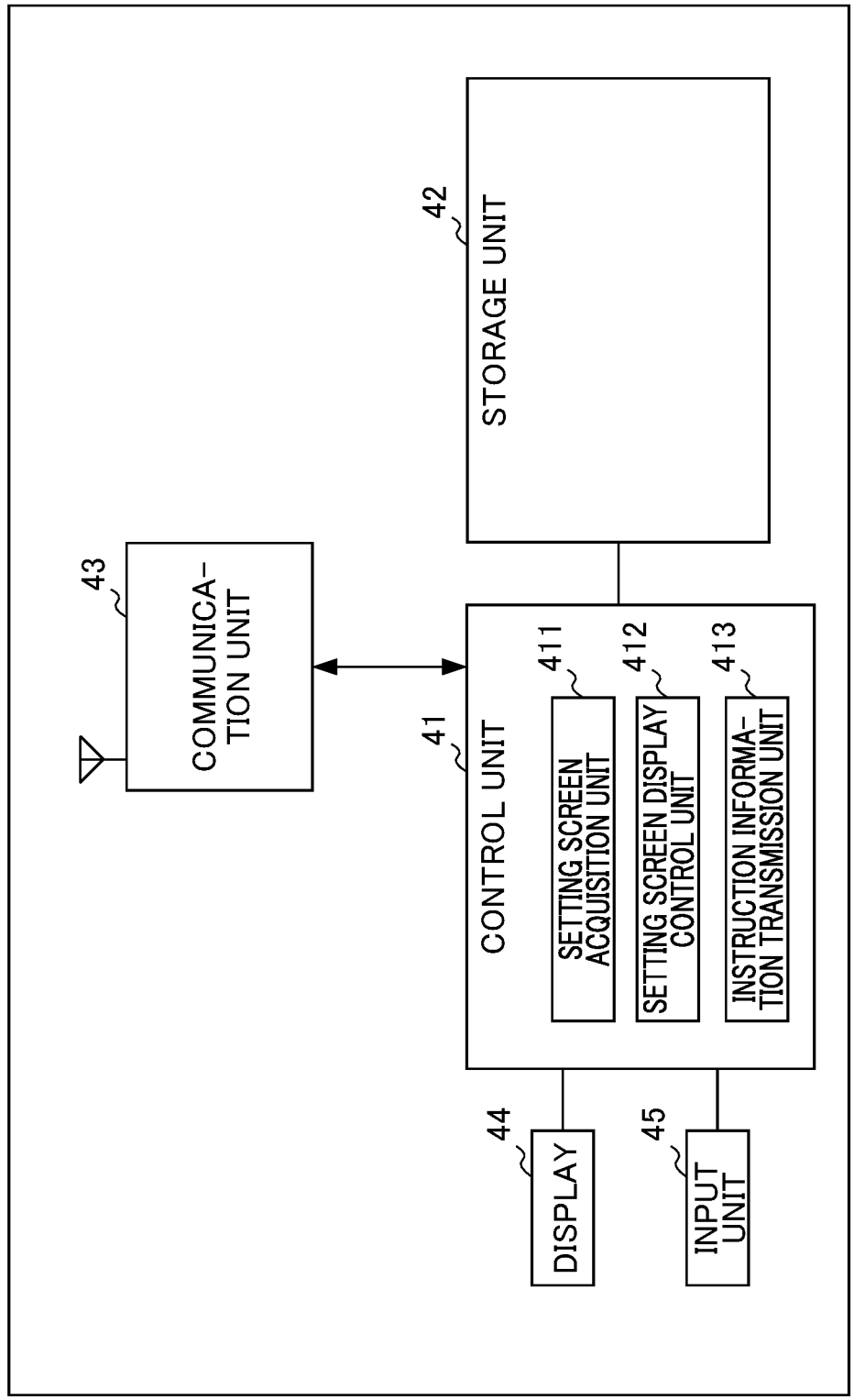
FIG. 4 is a block diagram illustrating one example of a functional configuration of a mobile terminal according to the present invention.

FIG. 4 is a block diagram illustrating the functional configuration of the mobile terminal 40. The mobile terminal 40 is able to be realized by, for example, a mobile phone, a smartphone, a tablet, a notebook PC, a laptop PC, or another portable electronic device. As shown in FIG. 4, the mobile terminal 40 includes a control unit 41, a storage unit 42, a communication unit 43, a display 44, and an input unit 45.

The control unit 41 is configured with an arithmetic processing unit such as a microprocessor to control respective units included in the mobile terminal 40. The control unit 41 will be detailed below. The storage unit 42, which is configured with, for example, a semiconductor memory, stores various types of information such as programs including control programs called firmware or operating system, a setting screen display program for assisting an operator in issuing a setting instruction, and others. The communication unit 43, which has a DSP and the like, realizes communication with another device (for example, the remote management server 30) via the communication network 50 on the basis of a standard such as 3G, long term evolution (LTE), and Wi-Fi (registered trademark). The display 44 is configured with a display device such as a liquid crystal display or an organic electroluminescent panel. The display 44 displays an image by receiving an instruction from the control unit 41. Main examples of the information to be displayed on the display 44 include various types of setting screens provided by the remote management server 30 (the setting screen providing unit 312). The input unit 45 is configured with an input device (not shown) and others, such as a physical switch called a ten key pad or a touch panel provided on the display surface of the display 44 in an overlapping manner. A signal based on input operation through the input unit 45, for example, pressing of the ten key pad by an operator or a touch on the touch panel by an operator, is output to the control unit 41, thereby enabling to transmit the setting instruction issued by the operator to the remote management server 30 via the communication unit 43.

The control unit 41 is described below. As shown in FIG. 4, the control unit 41 includes a setting screen acquisition unit 411, a setting screen display control unit 412, and an instruction information transmission unit 413, as functional blocks. The setting screen acquisition unit 411 acquires various types of setting screens provided (transmitted) by the remote management server 30 (the setting screen providing unit 312). The setting screen display control unit 412 displays the acquired various types of setting screens on the display 44. The instruction information transmission unit 413 transmits to the remote management server 30 (the setting screen providing unit 312) the various types of instruction information input by an operator via the various types of setting screens or the like. It is noted that the functions included in the control unit 11 are able to be realized by, for example, a Web service of the remote management server 30 and a Web browser included in the mobile terminal 40. The respective functional units of the remote management system 1 in the present embodiment according to the present invention have been described so far, on the basis of the configurations of the controller 10, the converter 20, the remote management server 30, and the mobile terminal 40. The operation of the remote management system 1 according to the present invention is described below on the basis of a numerical controller as an example.

<Processing Operation According to Present Embodiment>

Figure 5:
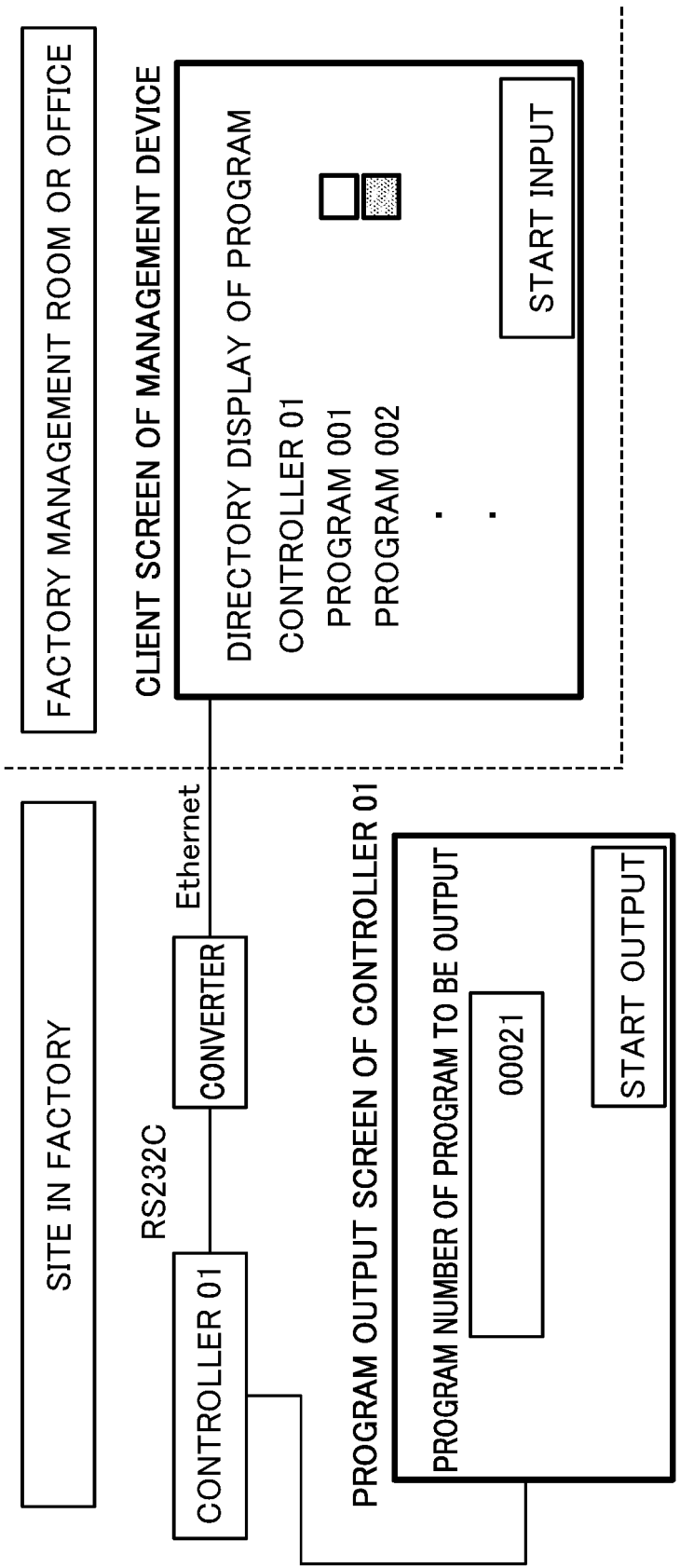
FIG. 5 is a diagram illustrating one example of the operation for uploading to the remote management server according to the present invention, a program of the controller which does not allow the remote management server to execute settings of an output destination.
Figure 6:
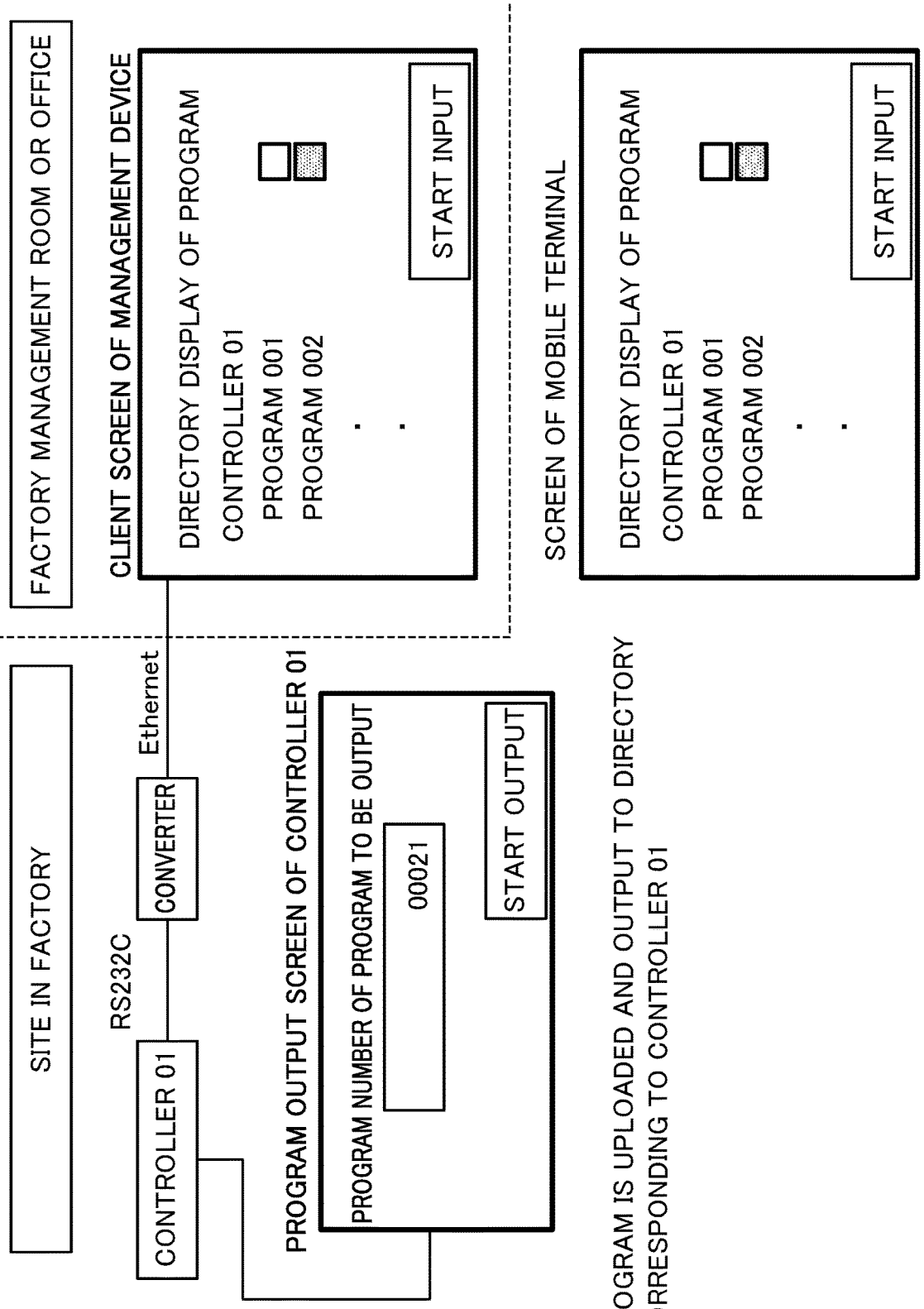
FIG. 6 is a diagram illustrating one example of the operation for uploading a program of the controller which does not allow the setting of an output destination by use of the mobile terminal according to the present invention.

Each of FIG. 5 and FIG. 6 is a diagram illustrating the operation for uploading a program of the controller 10 to the remote management server 30. FIG. 5 illustrates the processing operation for uploading a program of the controller 10 to the remote management server 30 without using the mobile terminal 40. On the other hand, FIG. 6 illustrates the processing operation for uploading a program of the controller 10 to the remote management server 30 by using the mobile terminal 40. The remote management server 30 is assumed to be disposed in a factory management room or an office away from the site of the factory in which the controller 10 is disposed, and the mobile terminal 40 is assumed to be carried by an operator into the site of the factory in which the controller 10 is disposed.

<Uploading Work>

Referring to FIG. 5, as described above, in order to upload a program stored in the controller 10 to the remote management server 30, an operator moves to the place in which the remote management server 30 is disposed and makes the display screen of the remote management server 30 display a directory display screen. The operator further designates another controller 10 as an input destination to which the program output by the controller 10 is able to be input and brings the remote management server 30 into the input waiting state by, for example, pressing an input start button. Thereafter, the operator moves to the place in which the controller 10 is disposed and makes the display screen of the controller 10 display a list of the program numbers of the programs stored in the controller 10. The operator designates the program number of the program to be uploaded to the remote management server 30 and further presses, for example, an output start button to start the output. This operation outputs and uploads the program selected in the controller 10 via the converter 20 to the designated directory (for example, the storage area corresponding to the controller 10) of the remote management server 30. Thereafter, the program number of the program uploaded from the controller 10 is displayed on the display screen indicating the directory of the remote management server 30. Therefore, the operator returns to the place in which the remote management server 30 is disposed, in order to check that the program has been uploaded in actuality, and checks the program number of the program having been uploaded from the controller 10. As described above, in the case of not using the mobile terminal 40, the operator is required to move between the place in which the remote management server 30 is disposed and the place in which the controller 10 is disposed.

On the other hand, referring to FIG. 6, the operator carrying the mobile terminal 40 is able to execute all of the processing in the place in which the controller 10 is disposed. The operator makes the mobile terminal 40 display the directory display screen provided by the remote management server 30. The operator further designates another controller 10 as an input destination to which the program output by the controller 10 is to be input, and further brings the remote management server 30 into the input waiting state by, for example, pressing the input start button. Thereafter, the operator makes the display screen of the controller 10 display the list of the program numbers of the programs stored in the controller 10, designates the program number of the program to be uploaded to the remote management server 30, and further presses the output start button to output the designated program. With this operation, the program selected in the controller 10 is output and uploaded via the converter 20 to the designated directory (for example, the storage area corresponding to the controller 10) of the remote management server 30. Thereafter, the operator makes the mobile terminal 40 display the directory screen indicating the program number of the program uploaded from the controller 10 to the remote management server 30, thereby enabling to check the program number of the program having been uploaded from the controller 10. As described above, by using the mobile terminal 40, the operator is able to perform the uploading work to the remote management server 30 and check the result of the uploading work while staying in the place in which the controller 10 is disposed. As described above, the operator is able to easily upload data by using the mobile terminal 40 without moving to the place in which the remote management server 30 is disposed.

Figure 7:
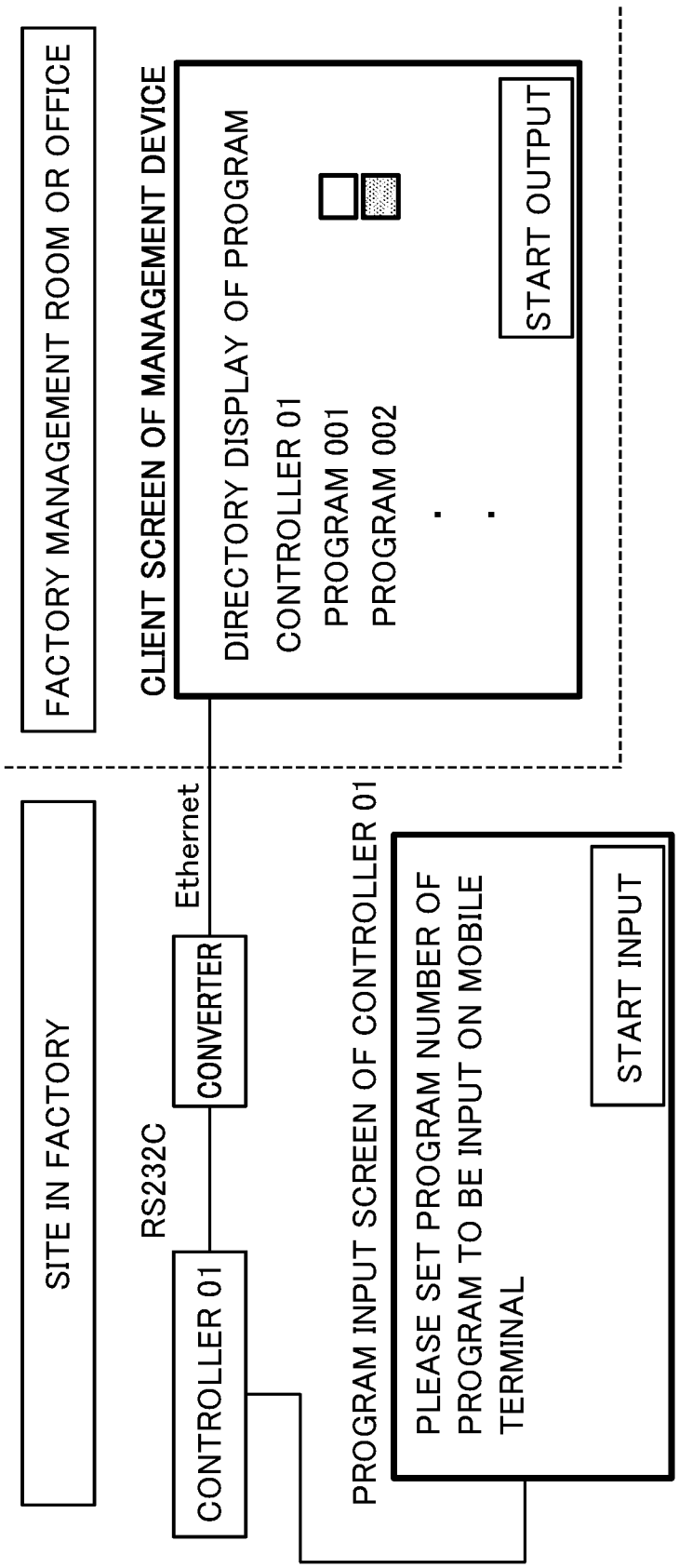
FIG. 7 is a diagram illustrating one example of the operation for downloading a program stored in the remote management, server according to the present invention to the controller which does not allow the remote management server to execute settings of an input destination.
Figure 8:
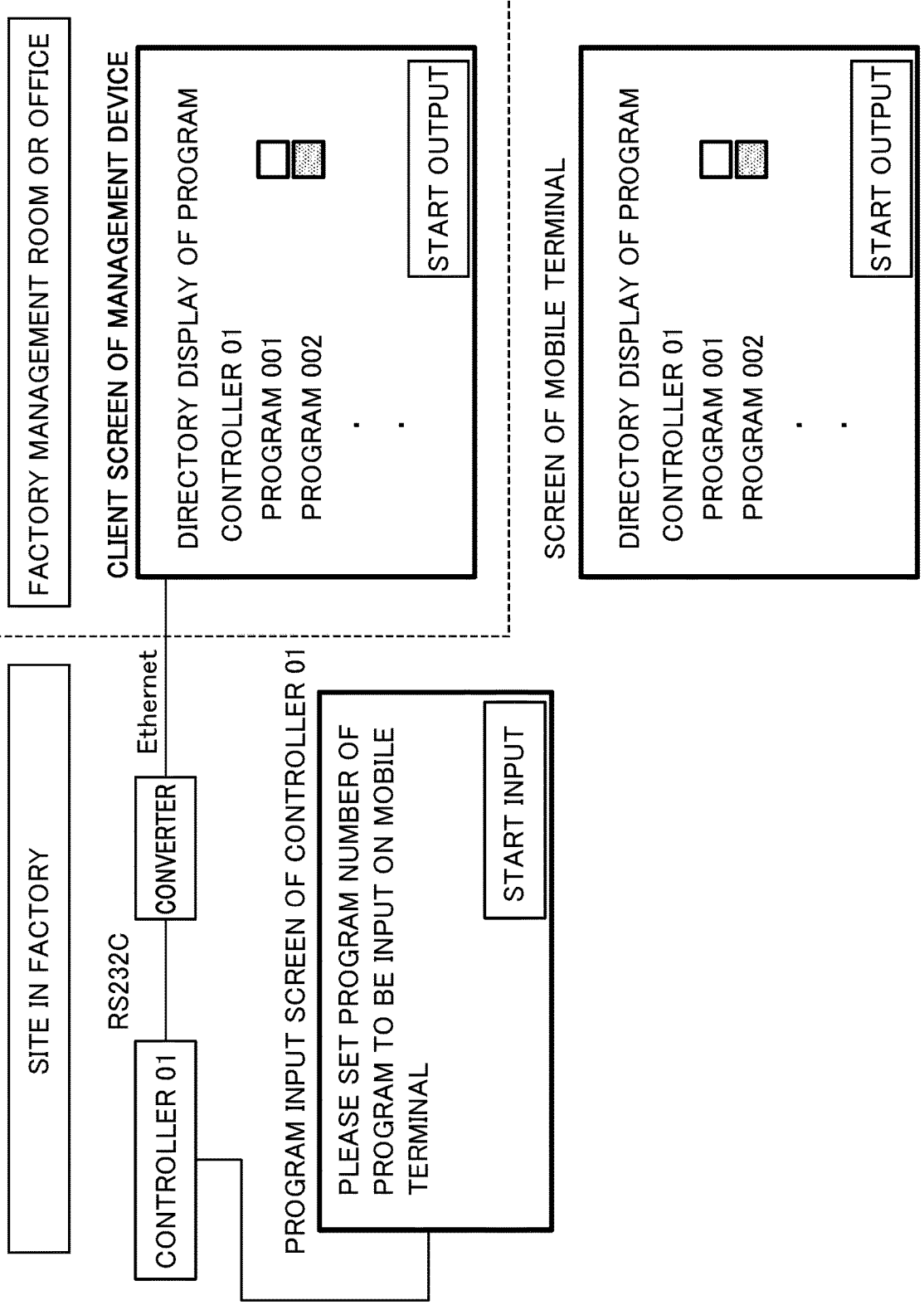
FIG. 8 is a diagram illustrating one example of the operation for downloading a program stored in the remote management server to the controller which does not allow the setting of an input destination by use of the mobile terminal according to the present invention.

The downloading work is described below. Each of FIG. 7 and FIG. 8 illustrates the operation for downloading a program managed by the remote management server 30 to the controller 10. FIG. 7 illustrates the operation for downloading a program managed by the remote management server 30 to the controller 10 without using the mobile terminal 40. On the other hand, FIG. 8 illustrates the operation for downloading a program managed by the remote management server 30 to the controller 10 by using the mobile terminal 40. The remote management server 30 is disposed in a factory management room or an office away from the site of the factory in which the controller 10 is disposed. The mobile terminal 40 is assumed to be carried by an operator into the site of the factory in which the controller 10 is disposed.

<Downloading Work>

Referring to FIG. 7, as described above, in order to download a program stored in the remote management server 30 to the controller 10, an operator moves to the place in which the controller 10 is disposed and brings the controller 10 into the input waiting state by, for example, pressing the input start button so that the controller 10 is able to receive the program to be output by the remote management server 30. Thereafter, the operator moves to the place in which the remote management server 30 is disposed and makes the remote management server 30 display the directory screen. The operator further designates one machine tool 200 as an output destination, selects the program number of the program to be downloaded to the controller 10 from the list of the program numbers of the programs stored in the remote management server 30, and presses, for example, the output start button to start the output. With this operation, the program selected in the remote management server 30 is output and downloaded to the storage unit of the controller 10 via the converter 20. Thereafter, the operator returns to the place in which the controller 10 is disposed and checks the program number of the program having been downloaded to the controller 10 in order to check that the program has been downloaded in actuality. As described above, the operator is required to move between the place in which the remote management server 30 is disposed and the place in which the controller 10 is disposed.

On the other hand, referring to FIG. 8, the operator carrying the mobile terminal 40 is able to execute all of the processing in the place in which the controller 10 is disposed. The operator brings the controller 10 into the input waiting state by, for example, pressing the input start button on the display screen of the controller 10 so that the controller 10 receives the program output by the remote management server 30. Thereafter, the operator makes the mobile terminal 40 display the directory display screen provided by the remote management server 30 and designates one machine tool 200 as an output destination. The operator further selects the program number of the program to be downloaded to the controller 10 from the list of the program numbers of the programs stored in the remote management server 30 and presses, for example, the output start button to start the output. With this operation, the program selected in the remote management server 30 is output and downloaded via the converter 20 to the storage unit of the controller 10. Thereafter, the operator checks the program number of the program having been downloaded to the controller 10 in order to check that the program has been downloaded in actuality. As described above, by using the mobile terminal 40, the operator is able to perform the downloading work from the remote management server 30 and check the result of the downloading work while staying in the place in which the controller 10 is disposed. As described above, the operator is able to easily download data by using the mobile terminal 40 without moving to the place in which the remote management server 30 is disposed.

It is noted that the operation in the remote management system 1 of the case of a PLC device is identical to the operation in the case of a numerical controller, except for the following points. As described above, a PLC device may not have the display 14. In that case, the operations relating to the uploading work of data to the remote management server 30 and the downloading work of data from the remote management server 30 are performed in the side of the remote management server. Just after the PLC device is powered on, the PLC device waits for instructions to upload and download data. It is noted that, even in the case where the operator executes the operation relating to the uploading of data to the remote management server 30 and the downloading of data from the remote management server 30 in the side of the remote management server, the operator normally moves to the side of the PLC device and checks data operation or settings in order to check that the uploading and the downloading have been performed correctly.

As described above, according to the present embodiment, the remote management server 30 is communicably connected to the controller 10 directly or via the converter 20 and is communicably connected to the mobile terminal 40 via a network. The remote management server 30 provides the mobile terminal 40 with the setting function included in the remote management server 30 with respect to the output and input including a data input/output destination and the like in the controller 10. Accordingly, the operator is able to check the settings or issue an instruction to the controller 10 on the display screen in the vicinity of the controller 10 and perform the settings relating to the output and input including a data input/output destination in the controller 10 by use of the mobile terminal 40 without moving to the place in which the remote management server 30 is disposed. That is, the operator is able to upload data such as a program or a parameter stored and used in the controller 10 to a predetermined directory of the program storage unit 321 or the parameter storage unit 322 of the remote management server 30 by use of the mobile terminal 40 while staying in the place in which the controller 10 is disposed. Conversely, the operator is able to download to the controller 10 by use of the mobile terminal 40 data such as a program or a parameter of the controller 10 stored in a predetermined directory of the program storage unit 321 or the parameter storage unit 322 of the remote management server 30 while staying in the place in which the controller 10 is disposed. That is, the operator is able to perform the setting work as in the case where the controller 10 has the setting function of setting a data output destination and a data input destination.

The remote management server 30 further provides the mobile terminal 40 with the list of identification numbers of data enabled to be output to the controller 10. Accordingly, the operator is able to easily download data by using the mobile terminal 40 while staying in the place in which the controller 10 is disposed without moving to the place in which the remote management server 30 is disposed.

Although an embodiment of the present invention has been described so far, the present invention is not limited to the embodiment described above. The effects described in the embodiment are listed just as the most preferable effects produced by the present invention. The effects produced by the present invention are not limited to those described in the embodiment.

Modification 1

Although in the present embodiment, a numerical controller and a PLC device serve as the controller 10, the present invention is not limited thereto. The present invention is applicable to any controller which allows only direct connection to another device via a predetermined connector, thus exchanging data with a fixed input/output destination, and does not have the setting function of setting a data output destination and a data input destination. It is noted that in the case where a remote management server is disposed away from a controller, an operator is able to perform the setting work in the place in which the controller is disposed by using a mobile terminal, which is especially effective. Furthermore, the present invention is applicable to a system including a device which exchanges data with a fixed input/output destination and does not have the setting function of setting a data output destination and a data input destination and further including a management device which is disposed away from the device and exclusively has the setting function to perform settings. In that case, the management device may be equipped with the function related to the remote management server according to the present invention. Alternatively, the remote management server according to the present invention may be equipped with the function of the management device. A distributed system may also be provided, in which the remote management server according to the present invention and the management device are communicated and linked.

Modification 2

Although the present embodiment has been described mainly by use of a machining program, a ladder program, and the like as data, the present, invention is not limited to a machining program or a ladder program. As described above, the present invention is applicable to any data to be stored in the controller 10.

Modification 3

In the present embodiment, each of the controllers 10 allows only direct connection to another device via a predetermined connector (for example, "the connector 16 for RS232C" to be described below), thus exchanging data with a fixed input/output destination, and does not have the setting function of setting a data output destination and a data input destination. However, the present invention is not limited thereto. The controllers 10 may include a controller 10A having a LAN connection function and the like and a controller 10B having the setting function of setting a data output destination and a data input destination in a coexisting manner. In that case, the controller 10A is communicably connected to the remote management server 30 by LAN connection. This connection enables to apply the remote management functions of the remote management server 30 and the mobile terminal 40. The remote management server 30 is capable of setting a data output destination and a data input destination by using the setting function included in the controller 10B of setting a data output destination and a data input destination. This allows the setting work and the like to be performed from the mobile terminal 40 with respect to either the controller 10 not having the setting function of setting an output destination and an input destination or the controller 10A having the setting function of setting a data output destination and a data input destination.

Modification 4

The respective functional units such as the input/output control unit 311, the setting screen providing unit 312, and the display control unit 313 of the remote management server 30 may be distributed to a plurality of devices on a network. Alternatively, the remote management server 30 may be a server on the cloud.

The remote management method executed by the remote management server 30 is realized software. In the case where the remote management method is executed by software, the programs which are included in the software are installed on a computer (the remote management server 30). Alternatively, these programs may be recorded in a removable medium and distributed to a user or may be distributed by being downloaded to a user's computer via a network.

EXPLANATION OF REFERENCE NUMERALS

1 REMOTE MANAGEMENT SYSTEM
10, 10A, 10B CONTROLLER
111 INPUT/OUTPUT INSTRUCTION UNIT
112 INPUT/OUTPUT CONTROL UNIT
12 STORAGE UNIT
14 DISPLAY
16 CONNECTOR FOR RS232C
20 CONVERTER
30 REMOTE MANAGEMENT SERVER
31 CONTROL UNIT
311 INPUT/OUTPUT CONTROL UNIT
312 SETTING SCREEN DING UNIT
313 DISPLAY CONTROL UNIT
32 STORAGE UNIT
33 COMMUNICATION UNIT
34 DISPLAY
35 INPUT UNIT
40 MOBILE TERMINAL
41 CONTROL UNIT
411 SETTING SCREEN ACQUISITION UNIT
412 SETTING SCREEN DISPLAY CONTROL UNIT
413 INSTRUCTION INFORMATION TRANSMISSION UNIT
42 STORAGE UNIT
43 COMMUNICATION UNIT
44 DISPLAY
45 INPUT UNIT

What is claimed is:

1. A remote management device communicably connected to at least one controller, the controller allowing only direct connection to another device via a predetermined connector, the controller exchanging data with a fixed input and a fixed output destination and the controller not having a setting function of setting a data output destination and a data input destination, the remote management device comprising:
a control unit; and
a communication unit configured to communicate with a mobile terminal via a network,
the control unit including:
an input and an output control unit configured to control, in a case where data held in the controller is to be outputted from the controller to the remote management device, a setting in which at least the controller is set as an input destination and the remote management device is brought into an input waiting state such that the data from the controller is inputted into the remote management device, and to control, in a case where data stored in the remote management device is to be outputted from the remote management device to the controller, a setting in which the controller is set as an output destination and an output start instruction is issued such that the data of the remote management device is outputted to the controller; and
a setting screen providing unit configured to provide the mobile terminal with a setting screen allowing a user to make the setting in which the data from the controller is inputted in the case where the data is to be outputted from the controller to the remote management device, and a setting screen allowing the user to make the setting in which the data is outputted to the controller in the case where the data is to be outputted from the remote management device to the controller.

2. The remote management device according to claim 1, wherein
the setting screen providing unit provides, in the case where the data is to be outputted from the remote management device to the controller, the mobile terminal with a setting screen such that a list of identification numbers of data stored in the remote management device and enabled to be output to the controller is displayed on a display screen and a user is allowed to designate at least one of the identification numbers of data.

3. The remote management device according to claim 1, wherein
the controller is a numerical controller, and
the input and the output control unit is further configured to execute a setting in which the data from the numerical controller is inputted into the remote management device in a case where the data is to be outputted from the numerical controller to the remote management device, and to output, when the numerical controller receives an instruction to output data to the remote management device, the data to the remote management device, and
to execute a setting in which the remote management device outputs the data to the numerical controller in a case where the data is to be outputted from the remote management device to the numerical controller, and to input, when the numerical controller receives an instruction to input the data, the data to the numerical controller set as the input destination.

4. A remote management method to be executed by a remote management device communicably connected to at least one controller allowing only direct connection to another device via a predetermined connector, the controller exchanging data with a fixed input and a fixed output destination and the controller not having a setting function of setting a data output destination and a data input destination, the remote management method comprising:

- a communication step of communicating with a mobile terminal via a network;
- an input and an output control step of controlling, in a case where data held in the controller is to be outputted from the controller to the remote management device, a setting in which at least the controller is set as an input destination and the remote management device is brought into an input waiting state such that the data from the controller is inputted into the remote management device, and controlling, in a case where data stored in the remote management device is to be outputted from the remote management device to the controller, a setting in which the controller is set as an output destination and an output start instruction is issued such that the data of the remote management device is outputted to the controller; and
- a setting screen providing step of providing, by the communication step, the mobile terminal with a setting screen allowing a user to make the setting in which the data from the controller is inputted in the case where the data is to be outputted from the controller to the remote management device, and a setting screen allowing the user to make the setting in which the data is outputted to the controller in the case where the data is to be outputted from the remote management device to the controller.

* * * * *